May 27, 1952 F. G. HENRY 2,598,540
REELING AND FEEDING DEVICE
Filed Dec. 7, 1948 7 Sheets-Sheet 1

INVENTOR.
Ferdinand G. Henry
BY Lancaster, Allwine & Rommel
ATTORNEYS.

INVENTOR.
Ferdinand G. Henry
BY
ATTORNEYS.

May 27, 1952 F. G. HENRY 2,598,540
REELING AND FEEDING DEVICE
Filed Dec. 7, 1948 7 Sheets-Sheet 3
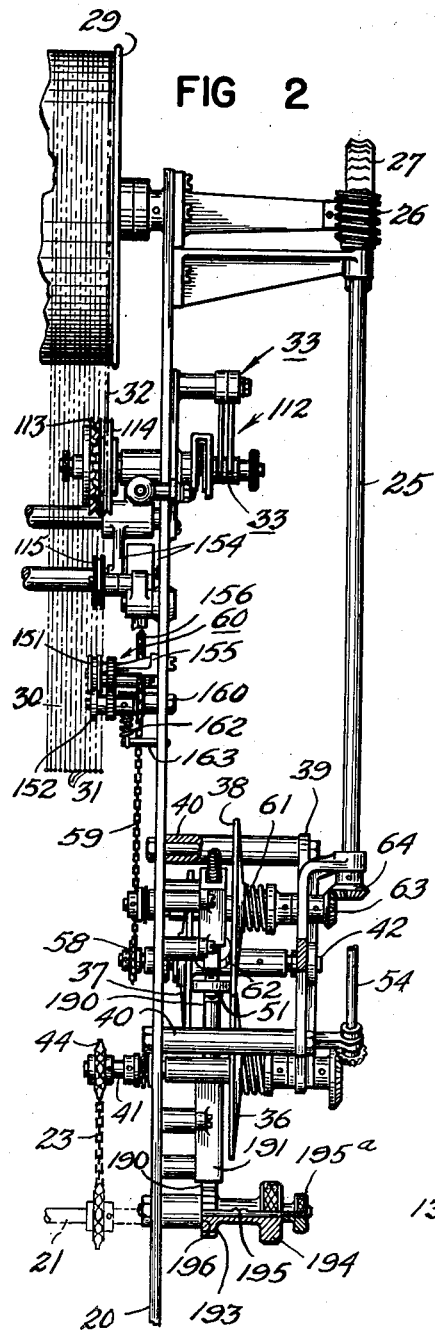
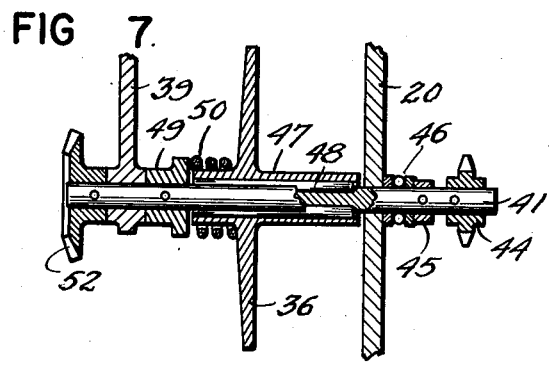
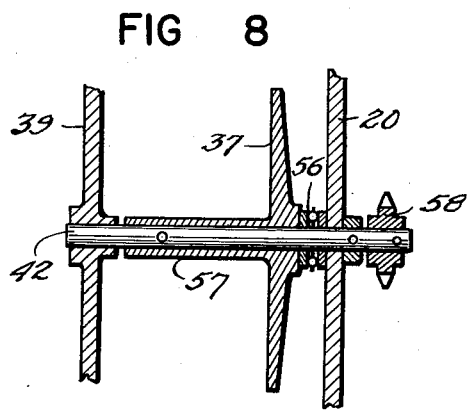
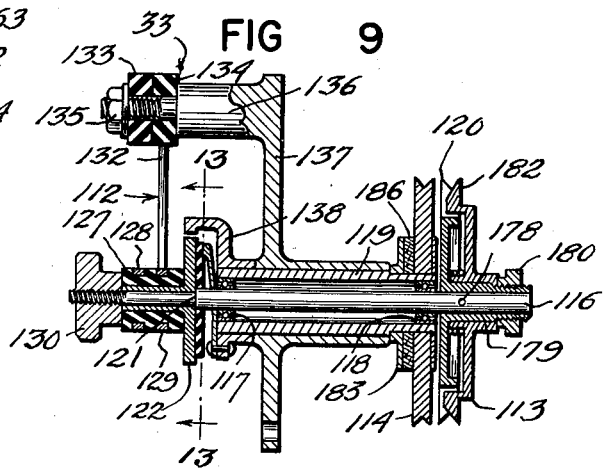
INVENTOR.
Ferdinand G. Henry
BY
ATTORNEYS.

May 27, 1952  F. G. HENRY  2,598,540
REELING AND FEEDING DEVICE
Filed Dec. 7, 1948  7 Sheets-Sheet 4
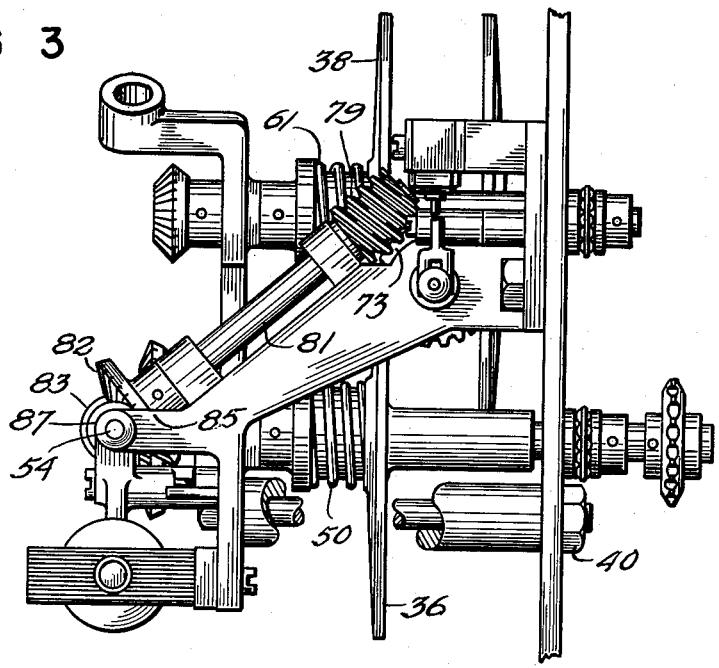
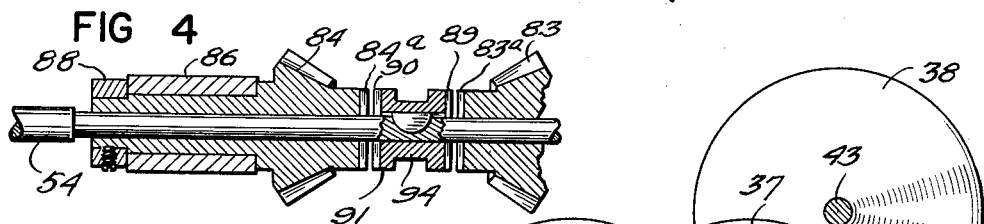
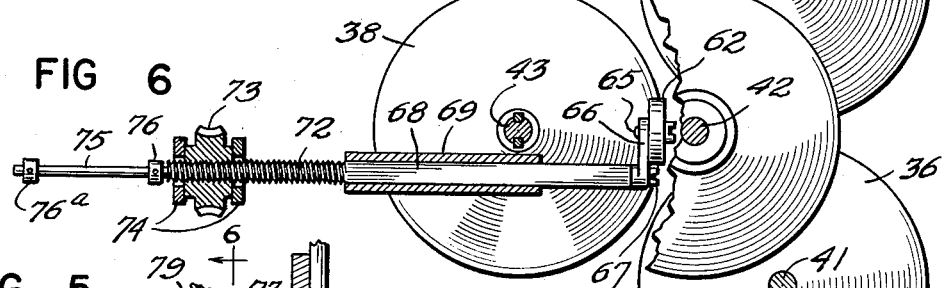
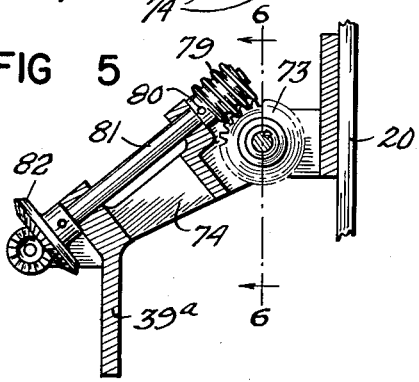
INVENTOR.
Ferdinand G. Henry
BY
ATTORNEYS.

May 27, 1952  F. G. HENRY  2,598,540
REELING AND FEEDING DEVICE
Filed Dec. 7, 1948  7 Sheets-Sheet 5

INVENTOR.
Ferdinand G. Henry
BY Lancaster, Allwine & Rommel
ATTORNEYS.

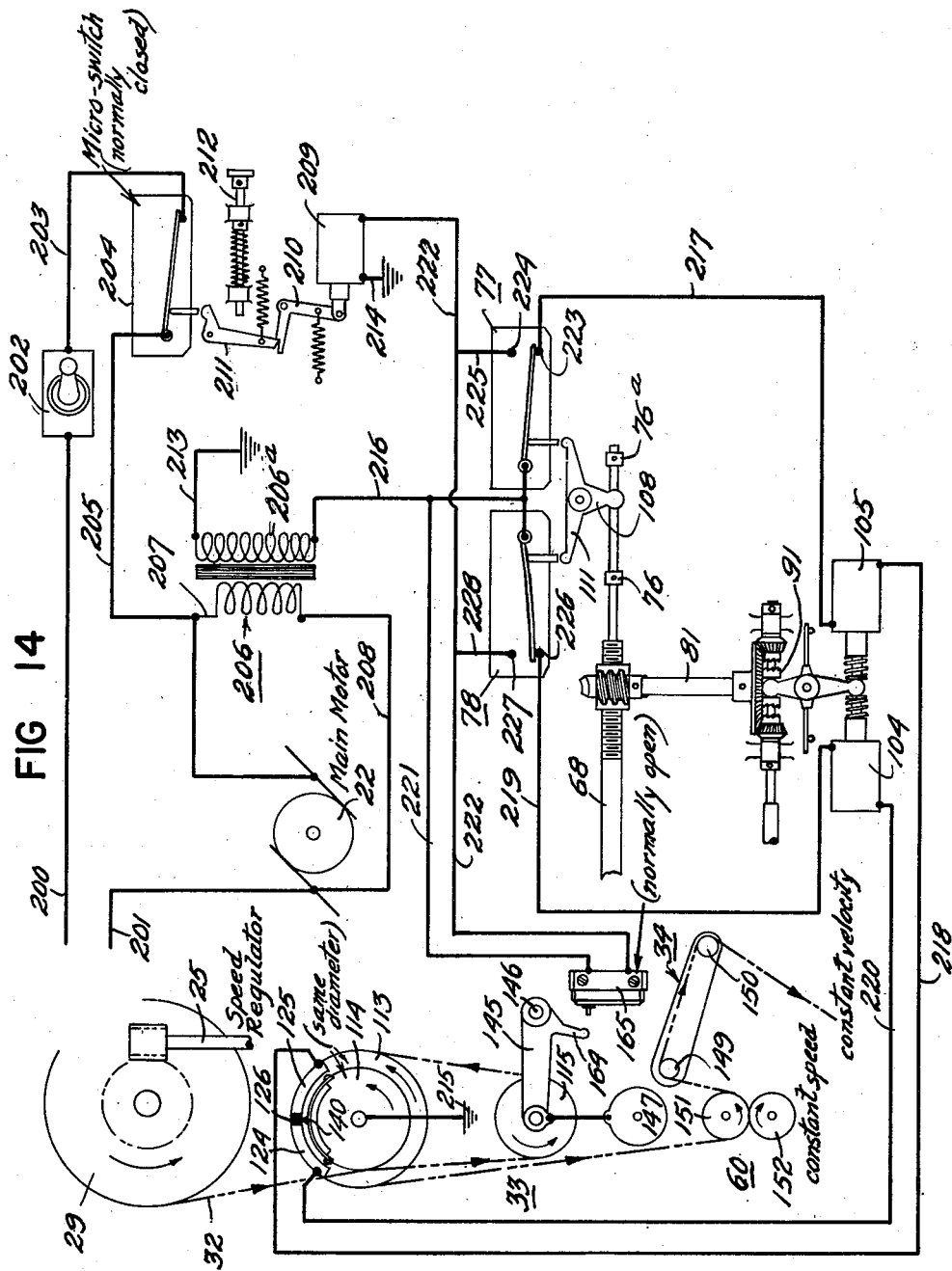

May 27, 1952  F. G. HENRY  2,598,540
REELING AND FEEDING DEVICE
Filed Dec. 7, 1948  7 Sheets-Sheet 7
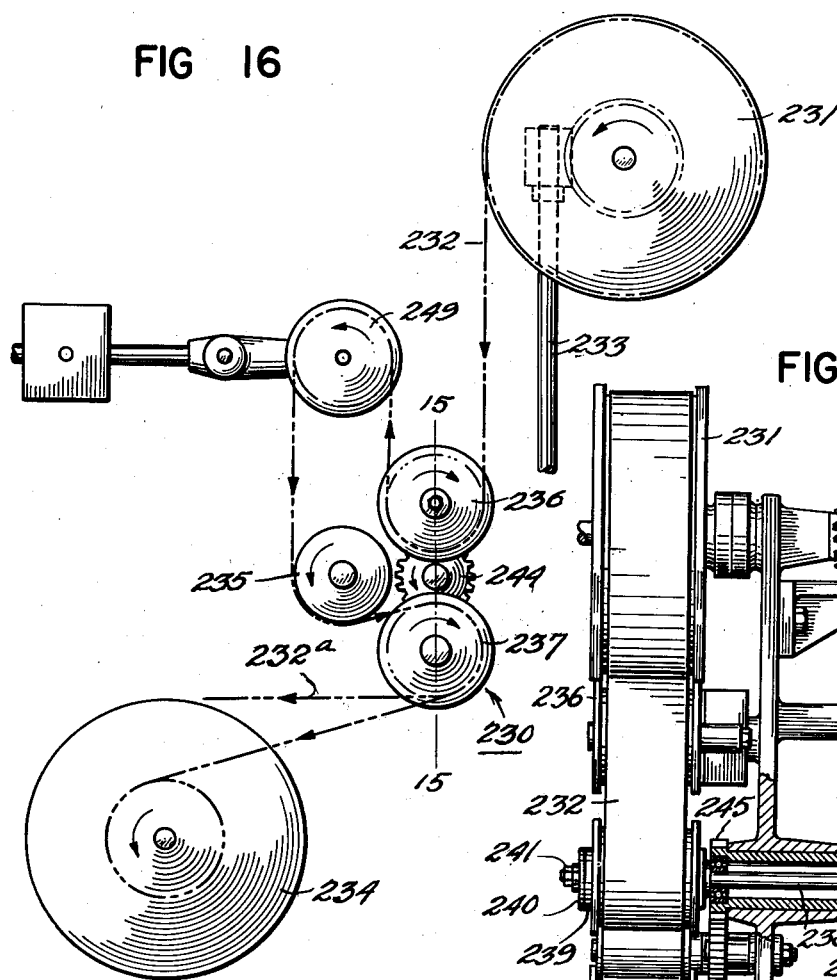
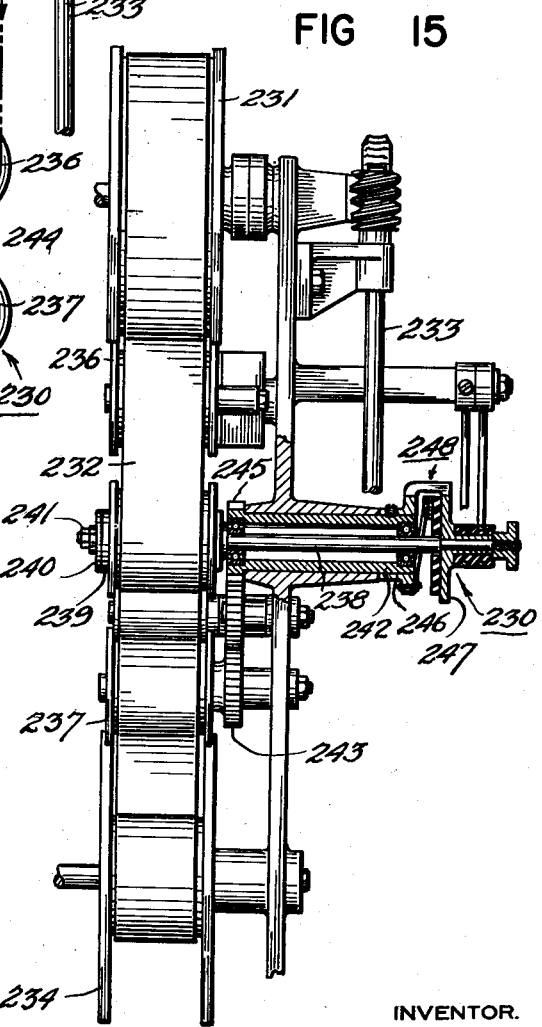
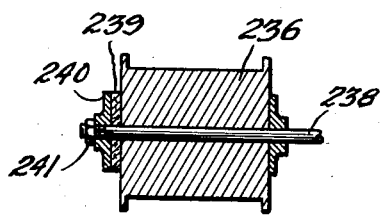
INVENTOR.
Ferdinand G. Henry
ATTORNEYS.

Patented May 27, 1952

2,598,540

UNITED STATES PATENT OFFICE 2,598,540

REELING AND FEEDING DEVICE

Ferdinand G. Henry, Jersey City, N. J.

Application December 7, 1948, Serial No. 63,877

17 Claims. (Cl. 66—86)

1

This invention relates to reeling and feeding devices and more particularly to the control means for taking up or letting out of yarns, thread, or wire-like elements such as in the art of knitting or in the arts of weaving or wire making and, also for film, web or strips or the like such as in the art of making webs or strips from plastics or fibrous materials such as are used in the making of paper, linoleum and other similar products the cross section of which may be of any form so long as the material is flexible in a direction perpendicular to the direction of movement of the material.

In the art of knitting, in any process using the warp principle, especially in the production of fabrics upon so-called high speed warp knitting machines, the uniformity and density or thickness of the stitches is determined in a large measure by the amount of yarn or thread allotted and fed to the needles during the knitting cycle.

In order to control the movement of the warp which supplies this feed it has been found necessary to provide some sort of brake or friction clutch device operated by the movement of a tension rod, over which the sheet of threads pass, and actuated by the pull of said threads during the knitting cycle. Control means for such winding and reeling mechanism have been based on tension differential or the like in weaving and knitting machines as well as other mechanisms for handling of wire tapes and the like.

While the use of such tensioning devices have been necessary in textile knitting or weaving machines to take up the slack released by the rotating warp beam during the time, in the cycle when no thread is being used by the needles, spring-loaded tension rods and other tension control devices do not always provide uniform tension and because of the present practice of using warps of increasingly larger diameters and weight, it has been found in practice that the force to overcome the inertia of such large warp beams may be greater than the combined tensile strength of the yarns or threads which intermittently pull upon the warp beam during the interval of release of the warp beam brakes coupled with the warp beam so that breakage of threads, or needles, or both occurs.

Stopping or starting of the machine produces an irregularity in the knitted fabric and the formation of a line or streak known in the art as "stop mark" which is very undesirable for obvious reasons.

Obviously, if the threads or yarns as well as the needles could be released of the pull they must

2 exert in order to put the warp beam in motion, these various troubles would be entirely eliminated.

Obviously also, if the threads or yarns could be fed or supplied to the needles at a uniform rate of speed and tension, as required by the needles and pattern of the fabric knitted, the problem of broken threads and needles would be solved, a uniform pattern of fabric would result and "stop marks" eliminated.

It is also obvious that, having removed from the thread and needles the necessity of setting the warp beam in motion, the inertia of the warp beam having been so isolated would no longer limit the speed of the knitting process and the machine could therefore be operated at a greatly increased knitting speed with correspondingly increased production and more perfect products. To this end my invention is herein described as applied to such a warp knitting machine.

My invention is herein illustratively shown in the accompanying drawings as applied to a warp knitting machine simply as a convenient basis for explaining the principle of the present invention although it may be embodied in many forms in different types of machines for greatly diversified products and purposes and I have illustrated several of them and it is understood that I do not consider the specific form of any one of the mechanism illustrated in the present disclosure to be limiting upon my invention, for example:

The specific control means and mechanism of one illustrated embodiment of my invention might be applied to other embodiments without in any way violating the scope of my invention.

In this respect that, by simply reversing the action of the device, it can be applied to rewinding either thread, or wire-like material, or web or strip material from a source of constant and uniform supply to a reel or coil of continually increasing diameter.

Also that in the same manner, this device can be applied to wind or rewind materials from a variable supply source, or from a coil of continually decreasing diameter to a coil of continually increasing diameter.

Although the control mechanism in accordance with my invention, in one disclosure, is applied to and embodied in a warp knitting machine of double warp or "Duplex" type as a convenient basis for explaining the principle of my invention, in another arrangement it is disclosed as it would be applied to a machine for handling and processing materials of a diversity broad enough to include either thread, yarn, rope or wire-like elements, or web, or strip or the like such as the materials aforementioned.

A principal object of my invention is to provide a device capable of letting out aforementioned material at a uniform velocity and tension from a source of supply of variable velocity and tension, that is to provide a linear velocity differential control system for such winding and reeling devices as distinguished from such tension differential principles of control as well as other systems of control.

A further object, is to provide means whereby the linear velocity of said material let out or taken up by the reel or beam will remain uniform regardless of any increase or decrease in the diameters of the coil or coils so wound or unwound.

A further object, is to provide means for maintaining uniform and constant tension of any predetermined magnitude on said material between the reel and the processing machine or mechanism.

Still another object is to provide an improved apparatus actuable by and in response to a change in linear velocity in an advancing thread, web or other material to correspondingly alter the speed of advance and to operate to control and regulate said velocity of advance by accelerating or retarding the speed of advance ultimately to produce substantially constant velocity of said moving material.

A further object is to provide means for feeding flexible materials at a continually uniform velocity and uniform tension and, especially, means capable of feeding this material at a high rate of speed.

Another object, especially in connection with the application of the invention to knitting machines, is to provide means to insure, in the successive knitting cycles, the requisite and accurate extent of yarn feed, from the conventional supply reel or beam, with flow of the sheet of yarns or threads over a responsive or floating yarn guide to the knitting elements, as required by the cycle, and to provide an improved action in the control of the drive of the reel or beam, with variable rotation and substantially provide continuous and responsive control of yarn feed throughout each cycle.

Still another object is to eliminate the use of brakes and friction clutches to eliminate the necessity of using spring-loaded or yieldable tension rods or levers actuated by the yarns or threads in direct cooperation with the feeding or feed control process, and to provide means for causing the warp beam or reel itself to take up slack, and means for maintaining substantially uniform lineal velocity and tension throughout the entire knitting operation. It is to be noted as will appear hereinafter that a conventional type of spring loaded tension bar is shown in the drawings as a part of the knitting machine and its function is entirely connected with the knitting operation with which it cooperates in the production of fabric: such a tensioning bar is used on knitting machines to compensate for the travel, back and forward of the needle bar, but not in conjunction with the differential linear velocity control apparatus in accordance with this invention.

According to the embodiment of my invention as applied to a warp knitting machine I apply such differential lineal velocity control means to one of the warp threads coming from the supply reel which afterwards is returned to follow the other warp threads through the machine to be incorporated in the fabric produced by the machine; all the warp threads are thus controlled in accordance with the velocity of the warp thread or strand passing through the differential velocity control means for controlling the speed of drive of the warp drum.

Such control means are individually applicable for controlling the speed of take-off of the warp threads on each warp drum of a duplex or multiple warp drum machine, likewise to other forms of machines employing wires, cables, tapes or the like whether multiple or single thread or warp and another feature in such machines is to provide for increasing or decreasing the speed of the controlled warp, varying the tension and also the speed of operation of the machine itself without interferring with the functioning of the lineal velocity differential control mechanism.

Further objects, details and advantages of my invention will appear in the following detailed description of the invention in connection with the accompaying drawings illustrating a highly practical application of the invention to knitting machines in particular and other web or strip material winding and reeling mechanism.

In the drawings:

Fig. 2 is a fragmentary side elevation of the knitting machine, parts being broken away.

Fig. 3 is an enlarged inclined side elevation of several parts of the speed varying mechanism and variable speed transmission corresponding with parts illustrated in Fig. 1A.

Fig. 4 is an enlarged sectional detail view taken on line 4—4 of Fig. 1 of the drive shaft in said speed varying mechanism.

Fig. 5 is an enlarged transverse sectional view taken on line 5—5 of Fig. 1 showing the driven shaft of said speed varying mechanism.

Fig. 6 is a longitudinal sectional view taken on line 6—6 of Fig. 5 showing the speed varying element of said speed varying mechanism and its cooperation with the transmission.

Fig. 7 is a detail transverse sectional view taken on line 7—7 of Fig. 1 showing the driving disk of the transmission.

Fig. 8 is a detail transverse sectional view taken on line 8—8 of Fig. 1 showing the intermediate disk of the transmission.

Fig. 9 is a detail vertical sectional view taken on line 9—9 of Fig. 1 showing a portion of the differential lineal velocity control element for the speed control of said transmission.

Fig. 14 is a wiring diagram of the control system showing elements of the knitting machine, driving transmission control elements, and differential lineal velocity control elements, with switches and the like diagrammatically illustrated.

Fig. 15 is a side elevation partly in vertical section along line 15—15 of Fig. 16 illustrating the application of such differential lineal velocity control mechanism to a web or strip material reeling device in accordance with my invention.

Fig. 16 is a fragmentary end elevation thereof.

Fig. 17 is a vertical sectional detail view taken on line 15—15 of Fig. 16 of one of the differential speed control rollers thereof.

Figure 1:
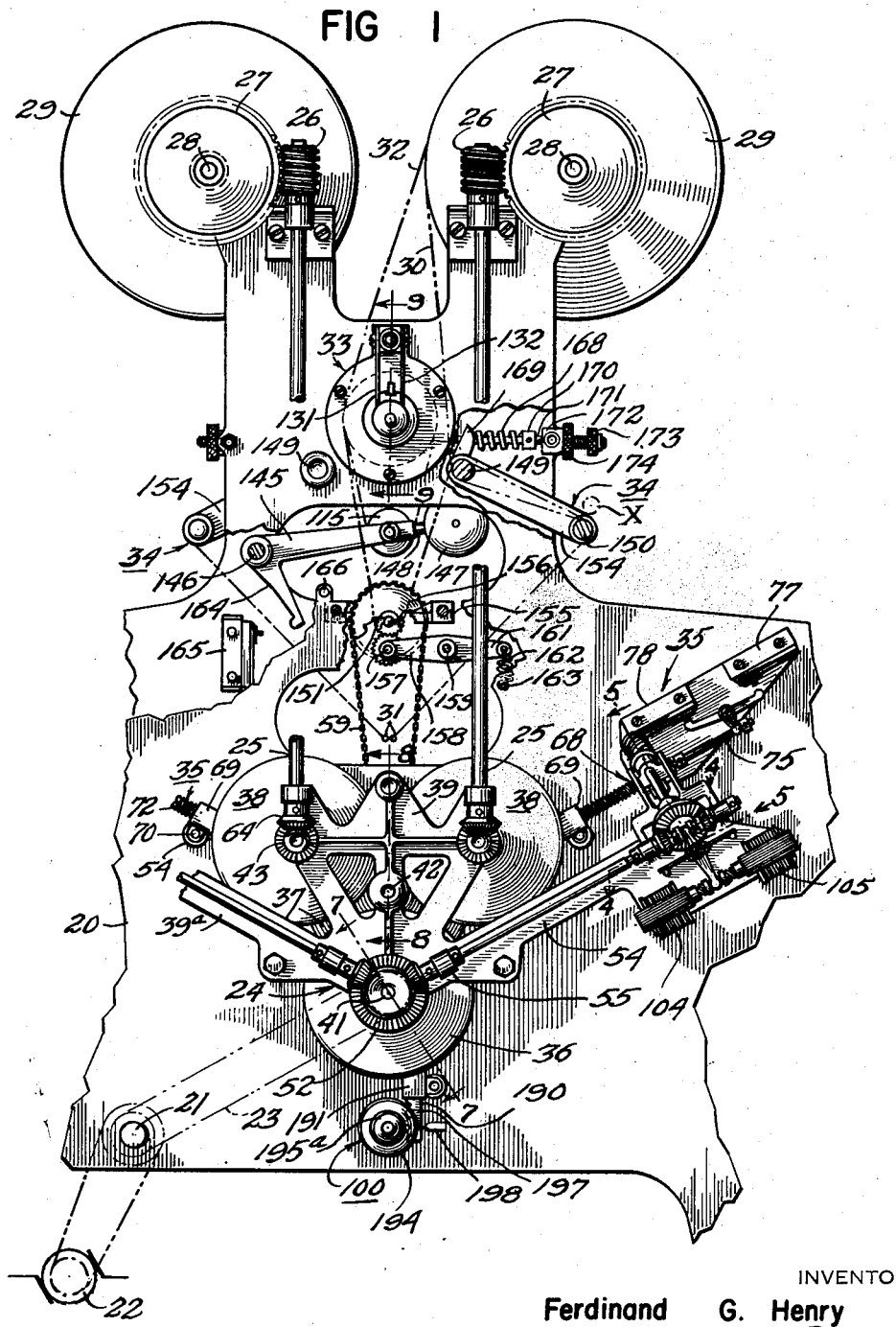
Fig. 1 is a fragmentary end elevation with parts diagrammatically shown of a "Duplex" or double warp knitting machine illustrating warp drum driving mechanism and showing various details of a differential lineal velocity control system in accordance with my invention as applied to one of the drums.

Referring to the drawings for the sake of setting forth my invention I have illustrated in Figs. 1 and 2 in a "Duplex" or double warp knitting machine, to which in the preferred form my invention is applied and is most applicable, only such parts as may be essential for an understanding of my reeling and feeding control system.

In general parts of the knitting machine illustrated include a knitting machine end frame structure 20, in the lower portion of which is indicated the knitting machine cam shaft 21 which is connected with a knitting machine driving motor 22.

From the knitting machine cam shaft 21 a driving chain 23 or the like is shown connected with a variable speed driving transmission 24 which in turn drives two separate warp drum drive shafts 25 having worms 26 on their upper ends meshing with worm gears 27 on shafts 28 of multiple thread warp drums 29 for driving the drums for letting out the warp threads 30 under the proper tension and at a controlled speed to needles 31 indicated.

Any one of the warp threads 30, the warp thread 32, nearest the end of the warp drum being selected for illustration acts as a pilot thread which takes a detour path through the warp thread differential lineal velocity control elements 33 carried preferably at the upper part of frame structure 20 adjacent to the drum 29 with which the elements cooperate, thence back to rejoin the remaining warp threads 30 in their course over conventional yielding tensioning adjusting supports 34 and on to knitting needles 31. For simplicity the differential lineal control elements 33 are illustrated for operation by the pilot warp thread 32 on the right hand warp drum 29 which may serve to control the let out of both drums 29 though in some instances it may be desired to have each drum separately controlled by individual differential lineal control elements.

As hereinafter set forth in detail the differential lineal control elements operate electric circuits which effect the operation of speed varying mechanisms 35 which are mechanically connected with the variable speed driving transmission 24 for governing the speed of rotation of each of the warp drums 29. And also cooperating with transmission 24 is a manual speed adjusting mechanism 100 in conjunction with which the differential lineal control elements 33 and transmission speed varying mechanisms 35 co-function as will be explained.

Referring in detail to the reeling and feeding mechanism, and more particularly first to the mechanical drives for warp drums 29 from the knitting machine cam shaft 21 according to the speed of which the letoff of the warp threads 30 must be synchronized, the speed of such letoff of the warp threads is primarily responsive to the operation of the variable speed driving transmission 24.

This transmission 24 includes the driving disk 36, an intermediate speed controlling disk 37 and a pair of drum driving disks 38, one each of the latter for each warp drum drive shaft 25. An auxiliary transmission frame 39 is suitably supported by bolts and spacer tubes or the like 40 on main end frame structure 20, with which it cooperates in bearing shafts 41, 42 and 43 upon which the respective disks 36, 37 and 38 are mounted so as to rotate with them. It will be noted that with the drive shaft 41 and its corresponding disk 36 located lowermost in the bearing frame structures, the intermediate disk 37 and its shaft 42 directly above the latter it is convenient to position disks 38 and their shafts 43 radially with respect to shaft 42 as a center at a 120° angle with respect to each other and drive shaft 41 in an arrangement for the transmission speed varying mechanisms 35 to be actuated by drive shaft 41 and for cooperation with the disks 37 and 38 as will presently appear. It will also appear that each of the shafts 41, 42 and 43 performs a particular function or dual function in the operation of the control system.

Referring particularly to drive shaft 41 and disk 36 fully illustrated in Figs. 1 and 2 and the sectional detail Fig. 7, it will be seen that shaft 41 is appropriately journaled in the frame members 20 and 39. Along said shaft, a chain sprocket 44 is keyed to the inner end (right end in Fig. 7) upon which driving chain 23 from the knitting machine cam shaft is mounted for driving the same in unison with said cam shaft. A collar 45 is keyed to the shaft and engages a thrust ball bearing 46 between it and frame structure 20. Between frame members 20 and 39 disk 36 is provided with a long cylindrical bearing hub 47 so that it can slide lengthwise thereon but a longitudinal keyway and key 48 prevent rotation of the shaft and disk with respect to each other. A collar 49 keyed to shaft 41 provides an abutment for a spring 50 which yieldingly urges disk 36 from frame 39 toward frame structure 20 into engagement with a friction drive roller 51 between its face and the face of intermediate disk 37 as best shown in Fig. 2. On the outer end of shaft 41 is a beveled gear 52 for engaging beveled gears 53 on shafts 54 mounted in bearings 55 on frame 39 and side extensions 39ª thereof providing a rotary operating drive for the speed varying mechanisms 35.

As best shown in Figs. 1, 2 and particularly Fig. 8 disk 37 is mounted on shaft 42 adjacent to frame structure 20 with a thrust ball bearing 56 between it and the frame 20 with its longitudinal hub 57 keyed to the shaft so as to rotate this shaft therewith in a selected speed ratio with respect to drive shaft 41 and knitting machine cam shaft 21 as determined by the manual speed adjusting mechanism 100. As will appear hereinafter this is an important feature since on its inner end shaft 42 carries a sprocket 58 for driving through a chain drive 59 the warp thread speed governing mechanism 60 to be described hereinafter.

Shafts 43 have their disks 38 longitudinally slidably mounted thereon in a similar manner as disk 36 is mounted on its shaft 41 so as to rotate the shafts 43 with them. As shown in Fig. 2 springs 61 urge these disks into engagement with friction rollers 62 the positions of which are controlled by the transmission speed varying elements 35. On the outer ends of shafts 43 are beveled gears 63 which mesh with beveled gears 64 on shafts 25 for rotating warp drums 29.

It will be noted that in the transmission 24 the disks 36 and 38 are outward on their shafts 41 and 43 with respect to disk 37 on its shaft 42 affording a compact arrangement for transmitting and varying the drive through from the knitting machine cam shaft 21 to the warp drums 29.

In this arrangement it will be noted that shafts 43 are at the same elevation, that is, level with respect to each other so that the warp drum driving shafts 25 are of the same length and the arrangement and operation is identical in affording a clockwise rotation to the left drum 29 and counterclockwise rotation to the right hand drum for letting off the warp threads to the respective sets of knitting needles 31. The thrust ball bearings on shafts 41, 42 and 43 carry the opposing forces of the springs on the respective shafts so that the rollers between the respective disks are constantly under pressure for frictional drives between disks from disk 36 to disks 38, the disks all rotating together and in the same direction.

The speed ratio between shaft 42 and shafts 43 depends entirely upon the location of friction drive rollers 62 with respect to these shafts. Obviously, when rollers 62 are nearest shafts 42 and furthest from shaft 43 the speed of shaft 43 will be a minimum and when roller 62 is nearest to shafts 43 and furthest from shaft 42 the speed of shaft 43 will be at maximum and when rollers 62 are midway between the shafts the speed of the shafts will be equal. Thus it is possible to obtain any speed of shafts 43 between these two extremes by shifting the rollers 62 one way or the other between the two points. In this manner warp drums or reels 29 may be accelerated or slowed down as required.

Figure 1A:
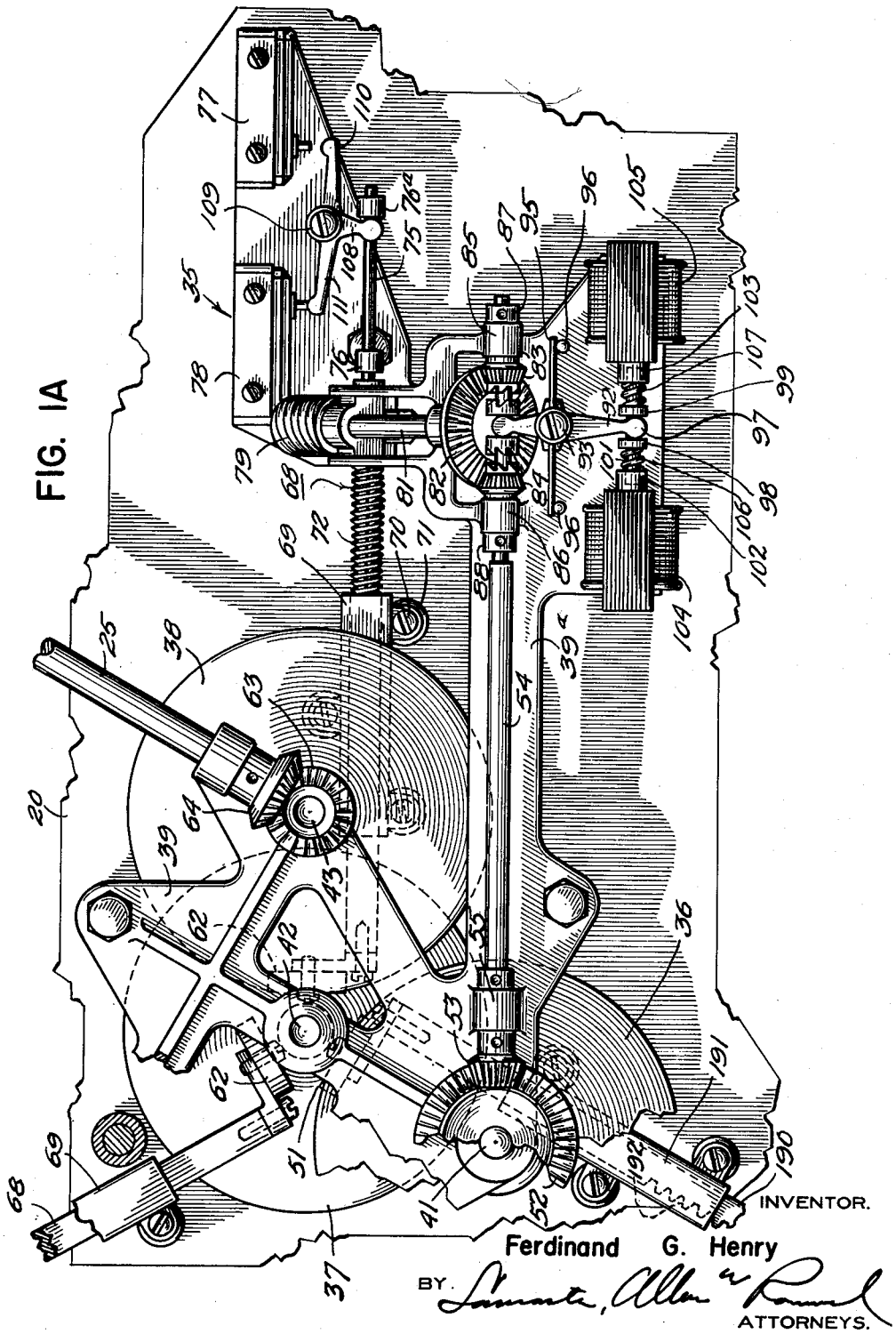
Fig. 1A is an enlarged end elevation inclined to a horizontal position for purpose of illustration of the speed varying mechanism for the variable speed transmission in the drive for one of the warp drums of the knitting machine showing associated parts of the transmission with several parts broken away or omitted.
Figure 10:
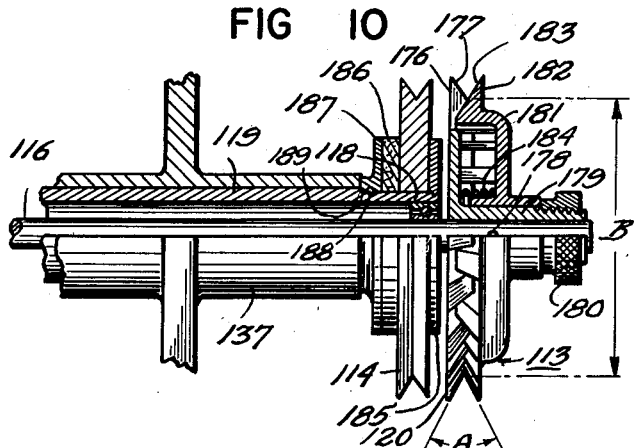
Fig. 10 is an enlarged view partly in elevation and partly in vertical section of the differential pulleys and adjacent parts shown in Fig. 9.
Figure 11:
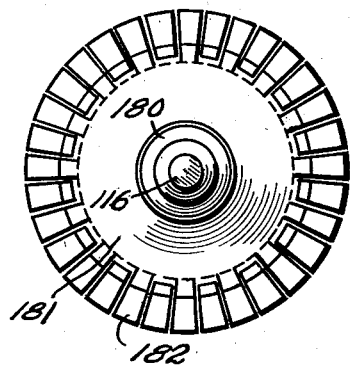
Fig. 11 is an enlarged end elevation of the outer adjustable pulley shown in Figs. 9 and 10.
Figure 12:
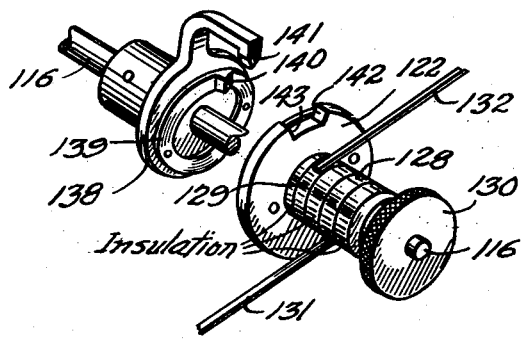
Fig. 12 is an enlarged exploded perspective view of the rotary switch elements driven by said differential pulleys of said differential lineal velocity control element.

To shift rollers 62 from one position to the other, the speed varying mechanism 35 is provided. As shown in Figs. 1, 1A and 6 which illustrate the speed varying mechanism 35 for the right hand warp drum 29, roller 62 is rotatably mounted on stud 65 fixed in arm 66 pivoted on stud 67 fixed in the end of an elongated longitudinally slidable member 68. This swinging construction permits roller 62 to find its own center between disks 37 and 38. Member 68 for a portion of its length is preferably of rectangular cross section and is slidably mounted in guide sleeve member 69 secured to frame structure 20 by screws 70 running through spacers 71 to frame 20.

Beyond the rectangular cross section portion of member 68 it is formed with a threaded portion 72 which rotatably engages the internally threaded hub of worm wheel 73 held laterally fixed in housing 74 which extends inwardly of frame 39a. Thus when worm wheel 73 is revolved, on the threaded portion 72 of member 68, roller 62 will move in one direction or the other depending upon the direction of rotation of worm wheel 73. Member 68 terminates in a coextensive rod 75 carrying limit stop collars 76 and 76a for operating either of a pair of limit switches 77 or 78 as will be described presently.

To rotate worm wheel 73, as best shown in Figs. 3 and 5 a worm 79 is in permanent engagement with worm wheel 73 and is rigidly fixed by pin 80 to a shaft 81 rotatably mounted in the above said housing 74 which extends from the upper part of frame 39a and engages frame structure 20. On shaft 81 is a rigidly fixed gear 82. Thus, when gear 82 is revolved, worm wheel 73 revolves imparting longitudinal motion to screw portion 72 of slide member 68 and roller 62, the direction of motion thereof depending entirely upon the direction of rotation of gear 82.

To effect this drive, as best shown in Figs. 1, 1A and 4 gears 83 and 84 are rotatably mounted in their respective bearings 85 and 86, which are formed in extensions of housing 74 and held in position by collars 87 and 88 so that, while free to revolve, these gears have no end play and are permanently engaged with gear 82.

Gears 83 and 84 are provided with clutch teeth at 83a and 84a designed to engage either teeth 89 or 90, respectively, on clutch 91 rotatably fixed to but slidably on the aforementioned shaft 54 which is driven by gear 53 in engagement with gear 52 on drive shaft 41 of the transmission 24, so that when drive shaft 41 is rotated clutch 91 will rotate. Now, if clutch 91 is shifted into engagement with gear 83, shaft 81 and worm wheel 73 will rotate in one direction and screw 72 of slide member 68 and roller 62 will move in a corresponding direction.

On the other hand, if clutch 91 is shifted into engagement with gear 84 the opposite will take place and screw 72 will move slide member 68 in the opposite direction taking roller 62 with it. While when clutch 91 is retained in the median plane or neutral position, complete disengagement of both gears 83 and 84 obtains and shaft 81 will remain motionless, stopping all movements of roller 62.

Thus the speed varying mechanism 35 affords a positive control over the location of roller 62 with respect to disks 37 and 38 and, of course, by this means, positive control over the speed of reel or warp drum 29. It is understood that this speed varying mechanism 35 is the same on both sides in connection with both disks 38 and warp drums 29 although it is not completely shown on the left side in the drawing.

One of the requisites of this invention is to increase the rotative speed of the warp drum or reel to correspond with the decrease in diameter of the winding of the thread or warp while it is being let out so that the lineal velocity of the thread remain substantially uniform. This means that roller 62 must be shifted gradually to a point of higher velocity on disk 38, or in other words, toward shaft 43. This is accomplished by shifting clutch 91 in engagement with the proper gear, depending upon whether worm 79 and wormwheel 73 and screw 72 are right hand or left hand.

The drawing shows right hand, so the shift would be to gear 84. If, on the other hand, the reel is rotating too fast, resulting in an over-feed a shift of clutch 91 to gear 83, reverses this action and the reel will slow down.

To accomplish this shifting of the clutch 91, as best shown in Fig. 1A a lever 92 pivoted on fulcrum pin 93 is provided to freely engage annular groove 94 (Fig. 4) in clutch 91 and is normally held on the median plane by, preferably, flat springs 95 fixed to lever 92 and engaging pins 96, carried by frame extension 39a. Lever 92 extending outwardly of fulcrum 93, is provided with a bifurcated extremity 97 engaging collars 98 and 99 free to slide on a rod 101 which is fixed to and between armatures 102 and 103 of solenoids 104 and 105 respectively. Springs 106 and 107 under compression, keep collars 98 and 99 hard against lever 92 and are there for the purpose of eliminating chatter due to A. C. on the solenoids.

Normally, clutch 91 is out of engagement and roller 62 is at rest with respect to longitudinal movement. However, when solenoid 105 is energized, armature 103 is drawn into this solenoid 105 pulling rod 101, armature 102, spring 106, collar 98, lever 92, collar 99, and spring 107 with it.

This swinging of lever 92 flexes one of the springs 95 against its abutment pin 96 while engagement is made between clutch 91 and gear 84. This ends the movement of the lever 92 and collar 98, but the armature goes on slightly beyond this point compressing spring 106 against collar 98 and lever 92 so that any vibration within the armature is thus absorbed.

When the solenoid deenergizes, the armature is freed and lever 92 returns to normal position under control of springs 95. The same action takes place for engagement with gear 83, when solenoid 104 is energized.

When the machine is in operation and shaft 54 is rotating, it is then only a matter of energizing either solenoid 104 or 105 in order to increase or decrease the speed of rotation of the reel or warp drum 29.

To limit the movement of roller 62 within its operative range, as mentioned an extension rod 75 is fixed in screw 72 of member 68 and provided with two fixed stop collars 76 and 76ª designed and located to engage bifurcated arm 108 of a lever fulcrumed at 109 when roller 62 reaches either end of its travel. This lever has two arms 110 and 111 extending outwardly, one designed to actuate the double-pole-double-throw switch 77 and the other to actuate the similar switch 78 referred to as limit switches.

At the end of the travel of member 68 in one direction the corresponding collar, 76 or 76ª, kicks up lever arm 108 and actuates its corresponding switch 77 or 78, and cuts off the current to its respective solenoid 104 or 105. The double throw feature of the switch also cuts off all current to the knitting machine, stopping all operations, as shown in the wiring diagram, Fig. 14 the circuits of which will be hereinafter set forth. Any type double-pole-double-throw switch or any other combination of conventional cut out system could be used in this respect, though the one shown is preferred.

To set the shifting mechanism for friction roller 62, or speed carrying mechanism 35 in action differential linear control elements 33 are provided, as shown in Figs. 1 and 2 and in section in Fig. 9 and certain detail elements thereof in Figs. 10 to 13 inclusive. In general these differential linear control elements 33 include a differential rotary switch 112 operated by a warp thread (32 of warp threads 30) or pilot thread operated differential pulleys 113 and 114 in conjunction with an idler pulley 115 and the warp thread speed governing mechanism 69.

Referring first to the differential pulleys 113 and 114 these are supported on a shaft 116 rotatably mounted in bearings 117 and 118 supported in quill 119. On shaft 116 is rigidly mounted the pulley 113 which is an expansion pulley comprising a disk 120 provided with a plurality of outwardly projecting teeth 176 having angularly disposed faces 177.

Disk 120 is fixed to shaft 116 by pin 178 and is provided at the end of its hub 179 with a threaded portion on which is screwed nut 180.

On hub 179 of disk 120 is slidably mounted disk 181 provided with an equal number of inwardly projecting teeth 182 having angularly disposed faces 183 designed to engage corresponding spaces on disk 120. Thus, when disk 181 is moved in or out of engagement with disk 120 angle A will remain unchanged but the root diameter B of the pulley will increase or decrease accordingly.

Spring 184, between the two disks, provides the required rigidity to hold disk 181 in correct set position and nut 180 provides means for adjustment. Thus, I have provided means for adjusting the diameter of this pulley and, while it is true that the peripheral surface of this pulley will not, at all adjustments, furnish a perfect and unbroken circle and that it will be formed of a series of small arcs, in this case, at least, it does not impair its efficiency. This adjustment is here provided in anticipation of manufacturing difficulties in the production of two pulleys of exactly the same diameters as the rotation of the two pulleys 113 and 114 must be maintained the same and the adjustment provides for the obtaining of the required identical circumferences.

Figure 13:
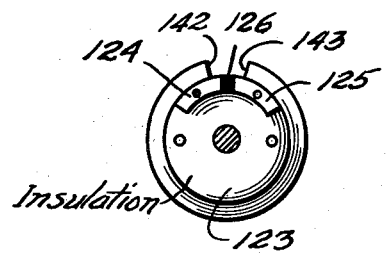
Fig. 13 is an enlarged vertical sectional view taken on line 13—13 of Fig. 9 showing one of said rotary switch elements in elevation.

At the opposite end of shaft 116 and abutting against a shoulder 121, is a hubbed disk 122 on which is permanently fixed an insulation disk 123 mounting contact segments 124 and 125, flush with, but separated by insulator 126 as shown in Figs. 9 and 13. Rigidly mounted on the hub of disk 122 is an insulated sleeve 127 provided with two metal slip rings 128 and 129. One slip ring is electrically connected to segment 124, the other to segment 125. A nut 130 presses the combination up against shoulder 121 preventing rotation with respect to shaft 116.

Thus, turning wheel 120 will revolve the entire combination. Two collector brushes 131 and 132, one in contact with ring 128 and the other in contact with ring 129, are fixed one to an insulating block 133 and the other to insulating block 134. Blocks 133 and 134 are set at the proper tension and position and held in place by nut 135 on a stud 136 supported by housing 137. One brush is electrically connected to solenoid 104, the other to 105, as shown in the wiring diagram Fig. 14.

Quill 119, rotatably mounted in housing 137, has at its one end, the friction-driven pulley 114 free to revolve on quill 119 and mounted between flange 185, which is securely fixed to end of quill 119 and a felt spacer 186 pressing against flange 187 which is fixed to quill 119 by pin 188 and abuts against shoulder 189 of quill 119.

Thus any considerable resistance against rotation offered by quill 119 will cause pulley 114 to slip and rotate alone leaving quill 119 to lag behind. Thus pulley 114 may rotate without quill 119 or quill 119 may rotate without pulley 114 except when the frictional resistance between the two exceeds the load on either pulley or quill when both will rotate together.

At the opposite end of quill 119 is fixed a hubbed disk 138 to the face of which is attached contact spring 139 provided with contact point 140 for contacting segment 124 or 125 whenever a relative motion occurs between hub 138 and disk 122 during rotation by a difference of their speed due to the warp drum being too slow or too fast. Finger 141 limits the relative angular motion between hub 138 and disk 122 by engaging abutments 142 or 143 in one or the other direction. It will be seen that, beyond the limit of this enclosed angular motion, the aforementioned friction-driven pulley will slip around quill 119.

This friction-driven feature is provided to shorten the period of contact thus eliminating unnecessary over feeding and over-slowing thus increasing the frequency of rectification and resulting in a more uniform and practically constant linear velocity of the let off of warp threads from the warp drums 29 as controlled by the aforesaid mechanism. Whenever contact point 140 contacts either one or the other segments 124 or 125 electrical connection is established with the corresponding solenoid 104 or 105 as will be explained in connection with the wiring diagram, Fig. 14.

In the operation of rotary switch it is necessary to pass or shift the pilot thread, warp thread 32, from one pulley to the other. For that purpose the idler pulley 115 is provided under which pilot thread 32 can be passed from one pulley 114 and returned to the other pulley 113 and from there continue on to the needles 31 as will be further described presently.

Idler pulley 115 is rotatably mounted on lever 145 fulcrumed on a stud 146 secured to frame structure 20. A weight 147 adjustable along a rod 148 extending outward of the lever 145 beyond idler pulley 115, is provided to maintain an adjustable normal tension in the thread for properly driving the two pulleys 113 and 114.

The threading of the pilot thread 32 as shown in Figs. 1, 2 and 14 is from warp drum 29 to pulley 114, around pulley 114 one turn, down under idler pulley 115, to pulley 113, over pulley 113 one half turn, down to and between rollers 151 and 152, up over rod 149 to and over rod 150 of the tensioning support mechanism 34 and to needles 31.

This, of course, applies to the "pilot" thread 32, the balance of the threads 30 on the warp beam or reel go direct to the needles by coming down from warp drum 29 under rod 149 to where they are rejoined by the pilot warp thread 32 and with it over rod 150 to the needles 31 for producing the fabric.

In the operation of these differential linear control elements 33 if the pilot thread 32 is fed from reel 29 at the same rate of linear speed as it is used by the needles, and if pulleys 113 and 114 are of equal diameters, no change in the linear velocity of the thread throughout this travel will be present and, therefore, both pulleys 113 and 114 will run in the same direction and at exactly the same speed of rotation and contact point 140 will continue to rest on the insulation point 126. However, should the supply from reel 29 lag behind, pulley 114 will also lag behind while pulley 113, due to the reserve thread in the loop of pulley 115 will go on at the original velocity and contact will be established between point 140 and segment 125 and, through the proper slip ring, brush and electrical connections, to solenoid 105 thereby engaging gear 84 and, as previously explained, shift roller 62 to a position of higher velocity thus speeding up reel 29.

When the velocity of the incoming thread from reel 29 is again restored to the velocity of the outgoing thread, on its way to the needles, contact point 140 will have returned to insulating point 126, solenoid 105 will release, disengaging clutch gear 84, stopping movement of slide 68 and roller 62.

Should the velocity of the thread fed from the reel and entering the device be greater than that leaving the device to the needles, the opposite will take place. Pulley 114 will travel ahead of pulley 113 closing the circuit to solenoid 104 causing slide 68 and roller 62 to a position of lower velocity, and again when the velocity of the outgoing thread is equal to the velocity of the incoming thread, contact point 140 will have been restored to insulated zone 126 and solenoid 104 will be cut off stopping movement of slide 68 and roller 62.

Thus, by this continued rectification by the linear velocity control element 33, a substantially uniform linear velocity is maintained in the threads let out by the reel and a sheet of threads or yarn of substantially uniform velocity is fed to the needles 31 without the needles playing any part whatever in the feeding operation or its rectification.

As already fully explained, of the sheet of yarn or threads 30, only one, called the "Pilot" thread 32, is used to regulate the entire warp beam no matter how long or how large in diameter this beam may be. Thus, no outside or "Dummy thread" is used or required and the very same thread, pilot thread 32, coming from the warp drum 29 regulates, not only itself, but all the other threads let out from the warp drum 29 on their way to the needles 31. In other words, the advance section of a thread (pilot thread 32) taken from the warp is caused to travel at a uniform linear velocity and, through the medium of two adjacently faced disks on both of which the same thread is wound, the following section, of the same thread, is caused to rectify any variation in linear velocity between itself and the advance section through the instrumentality of the differential linear velocity elements 33 to regulate the source of supply of said thread.

In the operation of the knitting machine the tensioning support mechanism 34 comprises the bars or rods 149 and 150 between levers 154, which is a conventional combination on present knitting machines and is found on practically all knitting machines of the type here considered. This mechanism plays no part in the speed of feeding of the threads 30 to needles 31 and therefore has no effect on the differential linear velocity elements 33 in the feeding of the threads to the needles 31. The levers 154 are duplicates, one at either end of the machine, and connected by and rigidly fixed to bar 149 which in turn is rotatably mounted, at each end, in the end frames as shown in Fig. 1. Bar or rod 150 extends across the two levers and is secured to them at their ends. These bars 149 and 150 extend the full width of machine. Levers 154 are rotatably mounted on bar 149 one at each side frame of the machine and held up yieldingly by springs, as shown at 168, which, pushing against arm 169 of lever 154, normally keeps rod 150 in an upper position. Spring 168 has an abutment collar 170 fixed to threaded rods 171 which in turn is free to screw in nut 172 fixed to the frame structure 20. Knob 173 fixed to screw 171 is turned for adjusting tension of spring 168 and lock-nut 174 locks the screw rods in place. Thus, rod 150 is yieldingly held upward and the thread supported thereby can follow the motion of the needles and needle bar by yielding downward and upon the return of the needle bar, rod 150, forced up by spring 168, will take up the slack in the threads.

The function of this tensioning support mechanism 34 is to provide a yielding support to the threads in order that the threads may follow the forward motion of the needle bar carrying the needles and, to take up that motion upon the return of said needle bar. In other words, it keeps the threads taut during the knitting cycle by oscillating about rod 149 as a center.

Since the warp drum 29 after rectification, by the linear velocity control elements 33, is letting out at practically constant linear velocity while the needles consume, as it were, the threads only during a portion of the knitting cycle, it follows that, for the balance of the cycle, the "overfeed" must be and will be taken up by lever 154 and rod 150 which will swing up to a point X above and over the normal take-up point necessary to take up the normal slack due to the return of the needle bar. It is this "overfeed" which will be consumed in the next knitting cycle to which is always added the current feed. Thus, a "load" ahead of the demand is prepared, and the needles can never have more tension on them than that originally set for the proper operation of the processing cycle.

However, the load on lever 154 is so much greater than the load applied to the pilot thread 32 by pulley 115 due to weight 147, that the oscillating action of lever 154 would cause a continuous oscillation of pulley 113, this would of course, effect the proper action of the circuit during this continued oscillation. This effect is eliminated by the warp thread speed governing mechanism 60 which operates as a "trap."

The warp thread speed governing mechanism 60 includes the rollers 151 and 152 which are brought together and intergeared so that they clamp the pilot thread 32 tightly between them, trapping all vibrations from going backwards to pulley 113. As shown in Figs. 1 and 2 roller 151 is rigidly mounted on a shaft rotatably mounted in a yoke 155 secured to frame structure 20. On this same shaft is also rigidly mounted sprocket 156 preferably drivingly connected with the sprocket 58 on shaft 42 by the chain drive 59, though any form of drive can be used.

Roller 152 intergeared with roller 151, is rotatably mounted on stud 157 in turn pressed rigidly in lever 158 fulcrumed on pin 159 secure in frame structure 20 by nut 160. Lever 158 has an arm 161 connected by spring 162 to pin 163 secured in frame structure 20. This preferred construction provides constant pressure between the rollers gripping the thread and also provides yielding means to permit the insertion of the pilot thread 32 between the rollers for the purpose of threading convenience.

The outside diameters of these two rollers, 151 and 152, and the pitch diameters of their respective gears are equal, thus all circumferential speeds are equal. The circumference of these rollers and the ratio of the sprocket drive are such that the amount of thread passing between the rollers during a knitting cycle is exactly the same as the amount of thread consumed by the needles in a knitting cycle, therefore the rollers 151 and 152 immediately set the linear velocity requirements for the rest of the device and for the entire machine.

If it is desired to increase the speed of these rollers the amount let out from the warp drum 29 and feed to the machine is automatically increased. If it is desired to decrease the speed of the rollers the amount let out from the warp drum 29 and feed to the machine is decreasd, and this is all done, as will appear hereinafter, without change gears and can be accomplished even while the machine is in full motion and in actual operation.

This is made possible because the warp drum drive derives its driving power from the same source, as rollers 151 and 152, that is disk 37, therefore, if there is an increase or decrease of one there is a consequent increase or decrease of the other. Obviously, shaft 54 has no effect whatever on this increase or decrease of feed requirement. The purpose of shaft 54 is to shift roller 62 to a new position between disks 37 and 38 as required, irrespective of the speed of rotation of the disks. It will do so at any speed of the disks, but as the speed of let out of the warp, increases, clutch 91 will act more frequently and for longer periods, in fact, the velocity of the let out at the warp could increase to a point where clutch 91 would remain continuously in engagement and the roller 62 would be continuously in motion in order to keep up with the rapidly decreasing warp diameter. This condition would be reached only when the amount of feed possible would have been reached and the maximum capacity of the drive attained.

The manual speed adjusting mechanism 100 is provided to effect this change in the feed, even while the knitting machine is in operation. This mechanism operates on the friction drive roller 51, which transmits motion from driving disk 36 to disk 37. This friction roller 51 is mounted on a slide 190 in the same manner that roller 62 is mounted on slide 68, and slide 190 is mounted to slide in guide 191 the same as slide 68 is mounted in guide 69. But slide 190 is manually operated, whereas slide 68 is automatically operated in response to the operation of the linear velocity control elements 33.

Slide 190 is provided with a rack 192 in engagement with a gear 193 which is in integral part of a sleeve and knob 194 rotatably mounted on a stud 195 threaded at the end to receive a knob 195ª. Stud 195, which is shouldered at 196, is secured in frame structure 20. By loosening knob 195ª, compression between shoulder 196 and sleeve 194 is released and the sleeve 194 and gear 193 can then be turned to move slide 190 up or down to set roller 51 in any position desired between disks 36 and 37 thus increasing or decreasing the speed of disk 37 to effect the feed desired. A scale 197 and index 198 may be provided to check the feed desired. When set, the knob 195ª is tightened in that position securely preventing any unwanted change in the feed selected.

As set forth, shaft 41 is driven by cam shaft 21 or it may be driven by any other positive drive means of the machine, by gears or by chain as shown, and its speed never changes with respect to the speed of the drive of the knitting cycle on the machine. But, as set forth, the speed of disk 37, hence the speed of rollers 151 and 152, may be changed at will by setting gear 193 and knob 194. Therefore the speed or rate of knitting will remain constant while the thread will feed a larger or smaller amount as desired whereby the density or pattern of the fabric may be changed at will.

A convenient and advantageous safety feature is the addition of arm 164 to lever 145, switch 165 and pin 166, so that in the event pilot thread 32 should break, lever 145 is released actuating switch 165 just before coming to rest on pin 166. This switch, through its connections as shown in diagram Fig. 14, stops the entire machine.

The operating circuits for the knitting machine driving motor 22 and various control circuits referred to in connection with the linear velocity control elements, transmission circuits and various other stop switches and main circuit controls as will appear are shown in the diagram, Fig. 14.

Representative illustrations of numerous elements of the machine and switching elements are shown in this diagram in the related circuits and particularly the arrangement of the linear velocity control elements 33 and their association with the pilot warp thread 32 let out from warp drum 29. In this disclosure, however, pulleys 113 and 114 are shown by different diameters with the course of pilot warp thread 32 outlined for the sake of clearness; other elements of the machine and control members as well as switch elements are shown in plan elevation or diagrammatically for illustrating the entire of the control circuits.

In this diagram the source of power preferably alternating current is represented by lines 200 and 201, the main circuit for knitting machine driving motor 22 being from line 200, main cut off switch 202, conductor 203, normally closed micro switch 204, conductor 205, through driving motor 22 to line 201; a transformer 206 is connected in parallel with motor 22 by conductors 207 and 208 so that its low voltage secondary 206a will be able to deliver current for operating various solenoids and switches of the control circuits whenever energy is applied to motor 22.

With the foregoing circuit for motor 22 the knitting machine, and all control circuits associated therewith, are manually controlled by the main cut off switch 202 of any desired type. When this switch 202 is closed current is supplied to operate motor 22, the power motor of the knitting machine provided micro switch 204 is closed. This switch 204 preferably is of the type illustrated wherein a low voltage solenoid 209 when energized will act on a trigger 210 to release a lever 211 which in turn acts on switch 204 to cut off all connections to open the circuits with lines 200, 201 stopping all operations. Plunger 212 is operable for resetting lever 211 to normal position for again closing switch 204. It is understood that this circuit breaker may be of any desired conventional design.

As illustrated various circuits are provided with grounded return circuits. The frame structure 20 of the knitting machine provides this ground return circuit for the low voltage control circuits, the secondary 206a having one of its terminals 213 grounded, solenoid 209 being grounded at 214 and the contact point 140 of the rotary switch is grounded as indicated at 215 for its return circuit.

The diagram shows contact point 140 in its neutral position on insulator 126 between segments 124 and 125 of the rotary switch of the differential linear control elements 33, which is the normal position when warp drum 29 is letting out the warp threads 30, including pilot warp thread 32 illustrated in this diagram, at the proper speed. Should a shortening of the thread occur due to too slow a drive of warp drum 29 contact point 140 will shift to segment 125 closing a circuit from transformer secondary 206a, conductor 216, switch 77, conductor 217, solenoid 105 for operating clutch 91, conductor 218, segment 125, contact point 140 and the grounding 215 thereof to grounded terminal 213 of transformer secondary 206a. Thus solenoid 105 will operate the clutch 91 to speed up the let out speed of warp drum 29.

In case a looseness or over feed of pilot thread 32 occurs due to an excess speed of warp drum 29 contact point 140 will move to engage segment 124. This closes the circuit from transformer secondary winding 206a by conductor 216, switch 78, conductor 219, solenoid 104, conductor 220, segment 124, contact point 140, grounding 215 thereof, to grounded terminal 213 of transformer winding 206a. Solenoid 104 will operate on clutch 91 to slow down warp drum 29. When in normal operation, contact 140 on insulation 126, in neutral, both solenoids 104 and 105 are deenergized, clutch 91 is disengaged, and shaft 81 and its gearing are at rest, so that the transmission will remain at the speed set by the speed varying mechanisms 35 as controlled by the differential linear control elements 33.

Should the pilot thread 32 break or the end of the warp be reached, idler pulley 115 will drop, due to weight 147 operating switch 165 to close a circuit from transformer winding 206a by conductors 216 and 221, switch 165, conductor 222, solenoid 209, ground 214 thereof to grounded terminal 213 of transformer winding 206a. This will energize solenoid 209 so as to open micro switch 204 to cut off all circuit connections with power lines 200, 201 and stop all operations.

The longitudinally slidable member 68 carrying roller 62, of the transmission speed varying mechanism 35, as heretofore set forth carries stop collars 76 and 76a for operating limit switches 77 and 78 at the limits of movement of roller 62 between disks 37 and 38 of the transmission 24, when collar 76 strikes lever 108, switch 77 shifts from contact 223 to deenergize solenoid 105, and engages contact 224; this closes the circuit from transformer winding 206a, through conductor 216, switch 77, contact 224 thereof, conductors 225 and 222, solenoid 209 and grounded terminal 214 thereof, to grounded terminal 213 of transformer winding 206a. Solenoid 209 is energized thereby to cut off the current at switch 204 as set forth.

When collar 76a strikes lever 108 switch 78 is shifted from contact 226 to contact 227. Current to solenoid 104 of the speed varying mechanism 35 is deenergized and the circuit is made from transformer winding 206a, conductor 216, switch 78 and contact 227 thereof, conductors 228 and 222, solenoid 209 and grounded terminal 214 thereof to grounded terminal 213 of transformer winding 206a. Solenoid 209 is energized to operate switch 204 to open position cutting off all current to the knitting machine and control circuits thereof.

It is to be noted that motor 22 represents the driving means for the knitting machine which may be of any desired type for driving the knitting machine cam shaft 21. The driving means for the control system in accordance with this invention is derived directly from the cam shaft 21 of the knitting machine or any other rotating part on the machine running in synchronism with the cam shaft.

Having set forth a highly satisfactory embodiment of my invention applied to knitting machines wherein the warp drum let off of the threads is controlled in accordance with the linear velocity as required for uniformity of the fabric produced along with limit controls and the like, it is clear that the velocity differential control system in accordance with my invention is susceptible of modification and also application to other machines in feeding, winding, unwinding or rewinding of other flexible materials, round, flat or other forms.

In Figs. 15, 16 and 17 is indicated an application of a linear velocity rectifying device 230, involving the principles of the linear velocity control elements 33 on the knitting machine, applied in a modified form to a reeling device for flat material such as web, braid, strip plastics, fibrous material, paper, linoleum, films, and the like.

In this arrangement as in the knitting machine a feed drum 231 carries such strip material 232 to be let off therefrom, the drum 231 being driven by a drive shaft 233, in very much the same manner as warp drum 29 of the knitting machine. The linear velocity rectifying device 230 operates on the drive transmission mechanism (not shown) for the drum drive shaft 233 to let out the material 232 at a uniform velocity as controlled by the rectifying device 230, the strip 232 being let out from drum 231 being threaded through this rectifier 230 and thence passing to a spool 234 upon which it is wound, or elsewhere as indicated particularly when two strips 232 and 232ª are operated upon in the device.

In the linear velocity rectifying device 230 instead of V-pulleys such as 113 and 114 of the linear velocity control elements 33, corresponding rollers 235 and 236 and 237 are provided with wide faces to accommodate flat strip material, as best shown in Fig. 17. As in the control elements 33, the roller 236 of the rectifier 230 has a running fit on its shaft 238 with a felt spacer 239 between one of its ends and a pressure collar 240 regulated by a nut 241 on the projecting end of shaft 238. Roller 237 and quill 242 are drivingly connected by a gear train comprising gears 243, 244 and 245 so that roller 237 will drive hub 246 in the same direction and at the same speed as disk 247 driven by roller 236, except when there is a speed differential to be corrected by the controls as fully described in connection with the knitting machine speed control mechanisms.

The differential switch mechanism 248 is the same as that of the linear velocity control elements 33 and the reeling device may have other controls corresponding with those described in connection with the knitting machine. In this arrangement the tightener 249 is located above the rollers 236 and 237 for convenience while an idler 235 (not absolutely necessary) has been provided for convenience in threading the machine.

In this case, the strip 232 may be fed from drum 231 to and under roller 236 to and over tightener 249 down and under idler 235 to and over roller 237 to rewinding spool 234 or other processing mechanism.

It will be noted that the differential velocity control means 33 have been referred to as a rectifier, and in the claims such means will also be referred to appropriately as speed responsive means. Further the needles 31 appropriately termed warp fabricating means, that is where the warp is operated upon used, or processed in any desired manner, noting that the principal purpose of my invention is to provide a let out or winding of the warp, strands or the like at a uniform speed and incident thereto controls of the machine including stopping in case of breakage, limits with respect to range of speeds consequently diameters of material wound on the warp drum and the like.

Many applications of this differential linear velocity control mechanism will be seen possible and will suggest themselves in connection with various arts where a regulated let out and take up is required.

I claim:

1. A warp knitting machine, including in combination with a cam shaft and means for driving the same and a warp drum for carrying a warp thread supply to be let out to warp fabricating means of the machine; a variable speed transmission drive between the cam shaft and warp drum for driving the drum to let out the warp thread supply to the warp fabricating means, speed varying mechanism for varying the speed of said transmission, and speed responsive means including a pair of elements over which the thread successively passes operated in accordance with differentials in linear velocity between two different sections of the thread let out from the warp drum over said elements for actuating said speed varying mechanism to maintain a uniform velocity of the delivered warp thread.

2. A warp knitting machine, including in combination with a cam shaft and means for driving the same and a warp drum for carrying a warp thread supply to be let out to warp fabricating means of the machine; a variable speed transmission drive between the cam shaft and warp drum for driving the drum to let out the warp thread supply to the warp fabricating means, speed varying mechanism for varying the speed of said transmission, speed responsive means including a pair of elements over which the thread successively passes operated in accordance with differentials in linear velocity between two different sections of the thread let out from the warp drum over said elements for actuating said speed varying mechanism to maintain a uniform velocity of the delivered warp thread, a warp thread speed governing mechanism driven at a speed corresponding with the speed of the cam shaft for controlling the operation of the speed responsive means, and means for changing the ratio of speed of said governing mechanism with respect to the cam shaft.

3. A warp knitting machine, including in combination with a cam shaft and means for driving the same and a warp drum for carrying a warp thread supply to be let out to warp fabricating means of the machine; a variable speed transmission drive between the cam shaft and warp drum for driving the drum to let out the warp thread supply to the warp fabricating means, speed varying mechanism for varying the speed of said transmission, differential linear velocity control means including a pair of coaxial pulleys and a weighted idler pulley over which a warp thread from said warp drum is trained in passing to the warp fabricating means, and means responsive to any variation of rotation of the coaxial pulleys by said warp thread for actuating said transmission speed varying mechanism for varying the drive of the drum whenever said coaxial pulleys are not rotating in unison.

4. A warp knitting machine, including in combination with a cam shaft and means for driving the same and a warp drum for carrying multiple warp threads to be let out to warp fabricating means of the machine; a variable speed transmission drive between the cam shaft and warp drum for driving the drum to let out the warp thread supply to the warp fabricating means, speed varying mechanism for varying the speed of said transmission, linear velocity control means including a pair of differentially operable pulleys operable for actuating said transmission speed varying mechanism to effect a drive of the drum to maintain a uniform velocity of the warp threads, and means for operating said linear velocity control means by diverting one of the warp threads let out from the drum over said pulleys successively to effect the operation of the same for operating the linear velocity control means and returning said diverted thread for passage with the remaining warp threads to the warp fabricating means.

5. A warp knitting machine, including in combination with a cam shaft and means for driving the same and a warp drum for carrying a warp thread supply to be let out to warp fabricating means of the machine; a variable speed transmission drive between the cam shaft and warp drum for driving the drum to let out the warp thread supply to the warp fabricating means, speed varying mechanism for varying the speed of said transmission, differential linear velocity control means including a pair of coaxial pulleys and a weighted idler pulley over which a warp thread from said warp drum is trained in passing to the warp fabricating means, means responsive to any variation of rotation of the coaxial pulleys by said warp thread for actuating said transmission speed varying mechanism for varying the drive of the drum whenever said coaxial pulleys are not rotating in unison, and means for stopping the knitting machine and controls in case of a discontinuance or breakage of said warp thread allowing said idler pulley to fall below a normal operating range.

6. A warp knitting machine, including in combination with a cam shaft and means for driving the same and a warp drum for carrying a warp thread supply to be let out to warp fabricating means of the machine; a variable speed transmission drive between the cam shaft and warp drum for driving the drum to let out the warp thread supply to the warp fabricating means, said transmission including a disk driven at a speed ratio in a proportion to the speed of the cam shaft, a driving shaft for the warp drum, a disk parallel to but eccentric with respect to the aforesaid disk for driving said warp drum driving shaft, a friction roller between said disks for transmitting rotary motion from the first disk to the second disk, speed varying mechanism for varying the driving speed by said transmission comprising, a reciprocable member carrying said friction roller for moving it with respect to said disks for varying the speed of the transmission driving means for operating said member in either direction including a rotating driving shaft, a two-way clutch for imparting an increasing or decreasing drive from said driving shaft to said reciprocable member, and means for operating said clutch from a released position to a driving position in either direction in response to changes in the velocity of the warp let out from the drum.

7. A warp knitting machine, including in combination with a cam shaft and means for driving the same and a warp drum for carrying a warp thread supply to be let out to warp fabricating means of the machine; a variable speed transmission drive between the cam shaft and warp drum for driving the drum to let out the warp thread supply to the warp fabricating means, said transmission including a disk driven at a speed ratio in a proportion to the speed of the cam shaft, a driving shaft for the warp drum, a disk parallel to but eccentric with respect to the aforesaid disk for driving said warp drum driving shaft, a friction roller between said disks for transmitting rotary motion from the first disk to the second disk, speed varying mechanism for varying the driving speed by said transmission comprising, a reciprocable member carrying said friction roller for moving it with respect to said disks for varying the speed of the transmission driving means for operating said member in either direction including a rotating driving shaft, a two-way clutch for imparting an increasing or decreasing drive from said driving shaft to said reciprocable member, means for operating said clutch from a released position to a driving position in either direction in response to changes in the velocity of the warp let out from the drum, and means for stopping the machine and controls at predetermined limits of movement of the friction roller with respect to said disks.

8. A warp knitting machine, including in combination with a cam shaft and means for driving the same and a warp drum for carrying a warp thread supply to be let out to warp fabricating means of the machine; a variable speed transmission drive between the cam shaft and warp drum for driving the drum to let out the warp thread supply to the warp fabricating means, said transmission including a disk driven at a speed ratio in a proportion to the speed of the cam shaft, a driving shaft for the warp drum, a disk parallel to but eccentric with respect to the aforesaid disk for driving said warp drum driving shaft, a friction roller between said disks for transmitting rotary motion from the first disk to the second disk, speed varying mechanism for varying the driving speed by said transmission comprising, a reciprocable member carrying said friction roller for moving it with respect to said disks for varying the speed of the transmission driving means for operating said member in either direction including a rotating driving shaft, a two-way clutch for imparting an increasing or decreasing drive from said driving shaft to said reciprocable member, means for operating said clutch from a released position to a driving position in either direction in response to changes in the velocity of the warp let out from the drum, and means for varying the ratio of the speed of said first disk with respect to speed of the cam shaft.

9. A warp knitting machine, including in combination with a cam shaft and means for driving the same and a warp drum for carrying a warp thread supply to be let out to warp fabricating means of the machine; a variable speed transmission drive between the cam shaft and warp drum for driving the drum to let out the warp thread supply to the warp fabricating means, said transmission including a disk driven at a speed ratio in a proportion to the speed of the cam shaft, a driving shaft for the warp drum, a disk parallel to but eccentric with respect to the aforesaid disk for driving said warp drum driving shaft, a friction roller between said disks for transmitting rotary motion from the first disk to the second disk, speed varying mechanism for varying the driving speed by said transmission comprising, a reciprocable member carrying said friction roller for moving it with respect to said disks for varying the speed of the transmission driving means for operating said member in either direction including a rotating driving shaft, a two-way clutch for imparting an increasing or decreasing drive from said driving shaft to said reciprocable member, means for operating said clutch from a released position to a driving position in either direction in response to changes in the velocity of the warp let out from the drum, and means for varying the ratio of the speed of said first disk with respect to speed of the cam shaft and correspondingly changing the velocity at which the warp is to be let out from the drum.

10. A warp knitting machine, including in combination with a cam shaft and means for driving the same and a warp drum for carrying a warp thread supply to be let out to warp fabricating means of the machine; a variable speed transmission drive between the cam shaft and warp drum for driving the drum to let out the warp thread supply to the warp fabricating means, said transmission including a disk driven at a speed ratio in a proportion to the speed of the cam shaft, a driving shaft for the warp drum, a disk parallel to but eccentric with respect to the aforesaid disk for driving said warp drum driving shaft, a friction roller between said disks for transmitting rotary motion from the first disk to the second disk, speed varying mechanism for varying the driving speed by said transmission comprising, a reciprocable member carrying said friction roller for moving it with respect to said disks for varying the speed of the transmission driving means for operating said member in either direction including a rotating driving shaft, a two-way clutch for imparting an increasing or decreasing drive from said driving shaft to said reciprocable member, means for operating said clutch from a released position to a driving position in either direction in response to changes in the velocity of the warp let out from the drum; means for varying the ratio of the speed of said first disk with respect to speed of the cam shaft comprising a third disk parallel to but eccentric with respect to said first disk driven at a speed in proportion to the speed of the cam shaft, a friction roller between said first and third disks of the transmission, a reciprocable bar carrying said friction roller for varying the speed ratio of said first and third disks, and manually operable means for moving said bar and roller to any desired position for the speed ratio required.

11. A warp knitting machine, including in combination with a cam shaft and means for driving the same and a warp drum for carrying a warp thread supply to be let out to warp fabricating means of the machine; a variable speed transmission drive between the cam shaft and warp drum for driving the drum to let out the warp thread supply to the warp fabricating means, speed varying mechanism for varying the speed of said transmission, differential linear velocity control means including a pair of coaxial pulleys and a weighted idler pulley over which a warp thread from said warp drum is trained in passing to the warp fabricating means, means responsive to any variation of rotation of the coaxial pulleys by said warp thread for actuating said transmission speed varying mechanism for varying the drive of the drum whenever said coaxial pulleys are not rotating in unison, and means for adjusting the effective diameter of one of the coaxial pulleys with respect to the other to provide equal circumferences of the pulleys for any condition of operation thereof.

12. A warp knitting machine, including in combination with a cam shaft and means for driving the same and a warp drum for carrying a warp thread supply to be let out to warp fabricating means of the machine; a variable speed transmission drive between the cam shaft and warp drum for driving the drum to let out the warp thread supply to the warp fabricating means, speed varying mechanism for varying the speed of said transmission, differential linear velocity control means including a pair of coaxial pulleys and a weighted idler pulley over which a warp thread from said warp drum is trained in passing to the warp fabricating means, and means responsive to any variation of rotation of the coaxial pulleys by said warp thread for actuating said transmission speed varying mechanism for varying the drive of the drum whenever said coaxial pulleys are not rotating in unison, said means comprising a rotary switch including a contact carried by one of said coaxial pulleys, a pair of spaced contacts on the other coaxial pulley between which contacts said first contact is positioned when the pulleys are rotating in unison at the required warp thread speed, and a pair of electrical solenoids for operating the speed varying mechanism having circuit connections with the corresponding contacts of said pair of contacts so that when either of said contacts is engaged by said first contact the speed varying mechanism is brought into operation to either increase or decrease the speed of the warp drum by varying the speed of the transmission.

13. In a winding and reeling device, a drum for carrying elongated material, a substantially constant speed driving element for driving said drum, a variable speed transmission between said driving element and the drum so that the speed of drive of the drum may be varied in accordance with the varying diameters of the material wound on the drum, means responsive to the differential linear velocity of the material extending to the drum for varying said transmission to maintain a uniform velocity thereof with respect to the drum by varying the speed of drive of the drum as the diameter of the material wound thereon changes, including a pair of pulleys over which the material successively passes operated in accordance with the differentials in linear velocity between two different sections of material extending from the drum over said pulleys for actuating said speed varying mechanism to maintain a uniform velocity of the material, and means for increasing or decreasing the velocity of the material extending to the drum.

14. In a warp knitting machine, including in combination with a cam shaft and means for driving the same and a warp drum for carrying a warp thread supply to be let out to warp fabricating means of the machine; the method of controlling the speed of the letoff of the warp thread from the warp drum which includes, the measuring of the velocity of a warp thread at one point, the measuring of the velocity of the same thread at an advanced point, comparing said velocities and influencing the speed of letoff of the warp threads to bring the speed at the two specified points to equality.

15. In a winding and reeling device including, a drum for carrying elongated material, a substantially constant speed driving element for driving said drum, a variable speed transmission between said driving element and the drum so that the speed of drive of the drum may be varied in accordance with the varying diameters of the material wound on the drum, and means responsive to the velocity of the material for measuring the velocity of the elongated material at one point, measuring of the velocity of the same at an advanced point and comparing said velocities and influencing the speed of the let-off of the material to bring the speed of the specified points to equality.

16. In a warp knitting machine including, a drum for carrying elongated material, a cam shaft driven at a substantially constant speed for driving said drum and a variable speed transmission between said cam shaft and the drum so that the speed of drive of the drum may be varied in accordance with the varying diameters of the material wound on the drum, the method of controlling the variable speed transmission between the cam shaft and drum which includes the measuring of the velocity of the elongated material at one point, the measuring of the velocity of the same at an advanced point, comparing said velocities and influencing the speed of the drum so that the let-off of the material will bring the speed at the specified points to equality.

17. The method of providing a constant let-off speed of the warp threads from the drum of a warp knitting machine, which consists in operating the cam shaft of the warp knitting machine at a constant speed, variably driving the drum from said constant speed cam shaft, selecting one of the warp threads let-off from the drum and measuring its velocities at successive points in its passage from the drum and returning said selected warp thread to pass with the other warp threads to the fabricating means in the machine, comparing the velocities at said points and controlling the driving of the drum from said cam shaft to equalize said velocities and thereby maintain a constant speed of all the warp threads regardless of the varying diameters of the warp threads wound on the drum.

FERDINAND G. HENRY.

REFERENCES CITED

The following references are of record in the file of this patent:

UNITED STATES PATENTS

| Number | Name | Date |
|---|---|---|
| 1,786,917 | Oehmichen | Dec. 30, 1930 |
| 2,168,071 | Perry | Aug. 1, 1939 |
| 2,214,355 | Tiselius | Sept. 10, 1940 |
| 2,361,526 | Bassist | Oct. 31, 1944 |
| 2,400,526 | Amidon | May 21, 1946 |
| 2,446,104 | Plunckett | July 27, 1948 |
| 2,468,611 | Arrowood | Apr. 26, 1949 |
| 2,470,125 | Young | May 17, 1949 |